US012759082B2

(12) United States Patent
Itakura et al.

(10) Patent No.: US 12,759,082 B2
(45) **Date of Patent: *Oct. 13, 2026**

(54) SEALING METHOD

(71) Applicant: Daicel Miraizu Ltd., Tokyo (JP)

(72) Inventors: Masahiko Itakura, Toyko (JP); Masahiro Katayama, Himeji (JP); Takayuki Uno, Himeji (JP)

(73) Assignee: Daicel Miraizu Ltd., Tokyo (JP)

( * ) Notice: Subject to any disclaimer, the term of this patent is extended or adjusted under 35 U.S.C. 154(b) by 593 days.

This patent is subject to a terminal disclaimer.

(21) Appl. No.: 18/161,432

(22) Filed: Jan. 30, 2023

(65) Prior Publication Data

US 2023/0166357 A1 Jun. 1, 2023

Related U.S. Application Data

(63) Continuation of application No. 16/465,908, filed as application No. PCT/JP2017/044387 on Dec. 11, 2017, now Pat. No. 11,590,608.

(30) Foreign Application Priority Data

Dec. 12, 2016 (JP) ................................ 2016-240305

(51) Int. Cl.
*B23K 26/352* (2014.01)
*B29C 45/14* (2006.01)
(Continued)

(52) U.S. Cl.
CPC ........... *B23K 26/352* (2015.10); *B29C 45/14* (2013.01); *B29C 45/14311* (2013.01);
(Continued)

(58) Field of Classification Search
CPC ..... F16L 47/24; B23K 26/352; B23K 26/354; B29C 45/14; B29C 45/14311; B29C 45/14467; B29C 45/14491; B29D 99/0053
See application file for complete search history.

(56) References Cited

U.S. PATENT DOCUMENTS 3,633,660 A 1/1972 Young
3,877,518 A 4/1975 Dreksler
(Continued)

FOREIGN PATENT DOCUMENTS

CN 103862619 A 6/2014
CN 105073376 A 11/2015
(Continued)

OTHER PUBLICATIONS

International Search Report, with English translation, issued in International Application No. PCT/JP2017/044387, date of mailing Jan. 16, 2018 (5 pages).

(Continued)

*Primary Examiner* — James M Hewitt, II
(74) *Attorney, Agent, or Firm* — FLYNN THIEL, P.C.

(57) ABSTRACT

A sealing method for sealing an opening of a metallic molded body with a resin molded body, the metallic molded body having a cavity therein and an opening connected to the cavity, includes a step of irradiating laser light onto a joining surface on a periphery of the opening of the metallic molded body in an energy density of 1 MW/cm$^2$ or more and at an irradiation rate of 2000 mm/sec or more to roughen the surface, and a step of placing, in a mold, a portion including the joining surface of the metallic molded body roughened in the preceding step and sealing the opening with a resin molded body formed by injection molding or compression molding of a resin.

3 Claims, 5 Drawing Sheets

(51) Int. Cl.
*B29C 65/70* (2006.01)
*F16L 47/24* (2006.01)

(52) U.S. Cl.
CPC .. *B29C 45/14467* (2013.01); *B29C 45/14491* (2013.01); *B29C 65/70* (2013.01); *F16L 47/24* (2013.01); *B29C 2045/1454* (2013.01)

(56) References Cited

U.S. PATENT DOCUMENTS

| | | | | |
|---|---|---|---|---|
| 4,044,443 | A | 8/1977 | Chartet | |
| 4,159,035 | A | 6/1979 | Chartet | |
| 4,196,923 | A | 4/1980 | Zimmerli et al. | |
| 4,323,115 | A | 4/1982 | Stafford et al. | |
| 4,367,017 | A | 1/1983 | Jimbou et al. | |
| 5,036,912 | A | 8/1991 | Woosnam | |
| 5,381,858 | A | 1/1995 | Fredrich | |
| 5,865,244 | A | 2/1999 | Moser | |
| 6,719,037 | B2 | 4/2004 | Crook | |
| 11,590,608 | B2 * | 2/2023 | Itakura .................. | B23K 26/00 |
| 2013/0249145 | A1 | 9/2013 | Okumura et al. | |
| 2016/0001398 | A1 | 1/2016 | Kancharla et al. | |
| 2016/0046050 | A1 | 2/2016 | Ikeda et al. | |

FOREIGN PATENT DOCUMENTS

| | | | |
|---|---|---|---|
| DE | 202011001497 | U1 | 4/2011 |
| EP | 3023244 | A1 | 5/2016 |
| EP | 3603563 | A1 | 2/2020 |
| JP | S4936166 | | 9/1974 |
| JP | H230508 | A | 1/1990 |
| JP | 2004-216425 | A | 8/2004 |
| JP | 2013-52669 | A | 3/2013 |
| JP | 5701414 | B1 | 4/2015 |
| JP | 5774246 | B2 | 8/2015 |
| JP | 2015-204729 | A | 11/2015 |
| JP | 5890054 | B2 | 12/2015 |
| JP | 5959689 | B2 | 12/2015 |
| JP | 5860190 | B2 | 2/2016 |
| JP | 2016-36884 | A | 3/2016 |
| JP | 2016-43413 | A | 4/2016 |
| JP | 2016-44337 | A | 4/2016 |
| JP | 2016-514055 | A | 5/2016 |
| JP | 2016-120648 | A | 7/2016 |
| JP | 2016-121745 | A | 7/2016 |
| WO | 2014/038563 | A1 | 3/2014 |
| WO | 2014/156989 | A1 | 10/2014 |
| WO | 2015/159644 | A1 | 10/2015 |

OTHER PUBLICATIONS

English International Preliminary Report on Patentability and Written Opinion of the International Searching Authority Issued in International Application No. PCT/JP2017/044387, Date of Issuance Jun. 18, 2019 (6 pages).
Extended European Search Report and opinion issued in Application No. 17881870.4, dated Jun. 9, 2020 (7 pages).
Japanese Office Action issued in Japanese Application No. 2016-240305, dated Sep. 15, 2020 (5 pages).
Chinese Office Action issued in Chinese Application No. 201780076834.2, dated Jan. 22, 2021 (8 pages).
Japanese Office Action issued in Japanese Application No. 2021-072283, dated Apr. 12, 2022 (5 pages).

* cited by examiner

Fig. 8 (a)
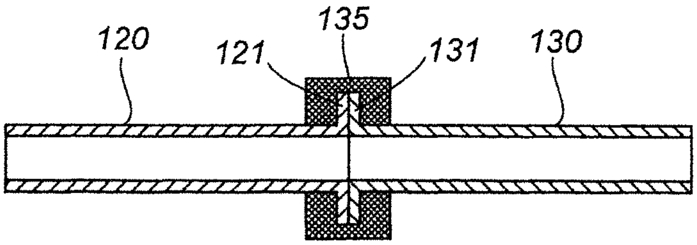
Fig. 8 (b)
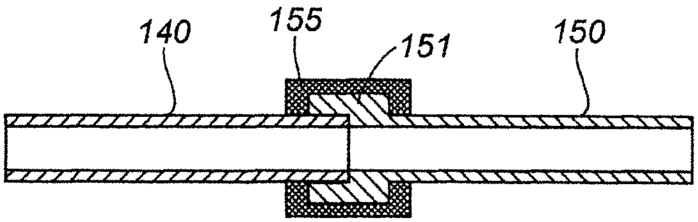
Fig. 8 (c)
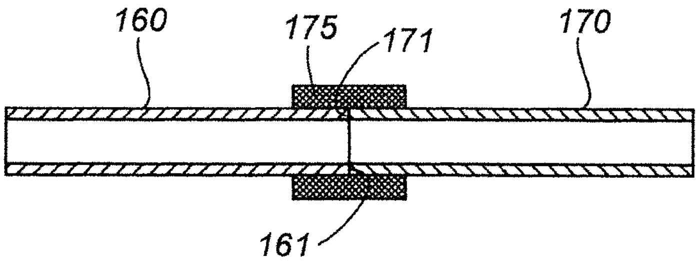
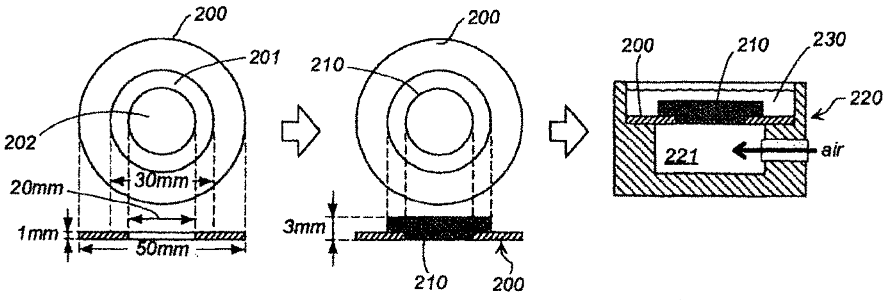
Fig. 9 (a)
Fig. 9 (b)
Fig. 9 (c)

SEALING METHOD

CROSS REFERENCE TO RELATED APPLICATIONS

This is a continuation of prior U.S. Ser. No. 16/465,908, filed May 31, 2019, now U.S. Patent No. 11 590 608, which is the National Stage of International Application No. PCT/JP2017/044387, filed Dec. 11, 2017, which claims priority from Japan Application No. 2016-240305, filed Dec. 12, 2016, the disclosures of which are hereby incorporated by reference in their entireties.

FIELD OF THE INVENTION

The present invention relates to a sealing method for sealing an opening of a metallic molded body with a resin molded body.

BACKGROUND OF THE INVENTION

There is known a technique in which at the time of manufacturing a composite molded body composed of a metallic molded body and a resin molded body, a surface of the metallic molded body is roughened before the metallic molded body is integrated with the resin molded body.

JP-B2 5774246 describes a roughening method of a metallic molded body surface in which a surface of a metallic molded body is continuously irradiated with laser light at an irradiation rate of 2000 mm/sec or more using a continuous wave laser to roughen the surface of the metallic molded body (claim 1).

In a composite molded body obtained by joining the metallic molded body with the resin molded body after performing the surface roughening method according to the invention described in JP-B2 5774246, the metallic molded body and the resin molded body are joined with a high joining strength (JP-B2 5701414).

SUMMARY OF THE INVENTION

The present invention has an object of providing a sealing method for sealing an opening of a metallic molded body by joining the metallic molded body and a resin molded body, making it possible to enhance sealability of a joining portion (also called connecting portion) between the metallic molded body and the resin molded body, and sealability of a joining portion of the resin molded body between the metallic molded bodies.

The present invention provides a sealing method for sealing an opening of a metallic molded body with a resin molded body, the metallic molded body having a cavity therein and an opening connected to the cavity, including:

a step of irradiating laser light onto a joining surface on a periphery of the opening of the metallic molded body in an energy density of 1 MW/cm$^2$ or more and at an irradiation rate of 2000 mm/sec or more to roughen the surface; and a step of placing, in a mold, a portion including the joining surface of the metallic molded body roughened in the preceding step and sealing the opening with a resin molded body formed by injection molding or compression molding of a resin, wherein the roughened joining surface of the metallic molded body has a porous structure in which a hole is formed in a range of an average depth from 10 to 70 μm from a surface.

According to the sealing method of the present invention, the resin molded body can seal the opening of the metallic molded body, a gap in the connecting portion between the metallic molded bodies, and the like with high sealability.

BRIEF DESCRIPTION OF DRAWINGS

FIG. 8(*a*) to FIG. 8(*c*) are cross sectional views explaining sealing methods in embodiments different from those in FIGS. 1(*a*)-1(*c*), FIGS. 2(*a*) and 2(*b*), FIGS. 6(*a*)-6(*c*) and FIG. 7, and each illustrate a axial cross section in a state where two metallic pipes with different connecting states are sealed from outside.

FIG. 9(*a*) and FIG. 9(*b*) are explanatory diagrams of a test method of sealability between an example and a comparative example, and FIG. 9(*a*) illustrates a plan view and a cross section, FIG. 9(*b*) is a plan view and a cross section and FIG. 9(*c*) is a cross section.

Figure 1:
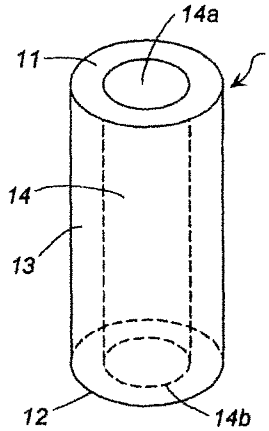
FIG. 1(*a*) to FIG. 1(*c*) are diagrams explaining a sealing method of the present invention, wherein FIG. 1(*a*) is a perspective view of a metallic molded body, FIG. 1(*b*) is a plan view of the metallic molded body in FIG. 1(*a*), and FIG. 1(*c*) is a plan view of the metallic molded body (composite molded body) after being sealed with the resin molded body.
Figure 1:
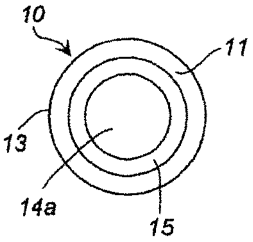
Figure 1:
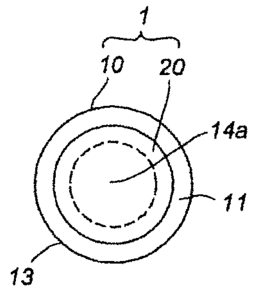
Figure 2:
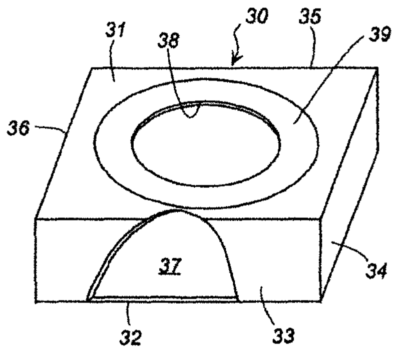
FIG. 2(*a*) is a perspective view of a metallic molded body different from that in FIGS. 1(*a*)-1(*c*) in a state of being partially cut away for the inside to be viewed, and FIG. 2(*b*) is a perspective view of a sealed metallic molded body (composite molded body) in an embodiment different from that in FIGS. 1(*a*)-1(*c*).
Figure 2:
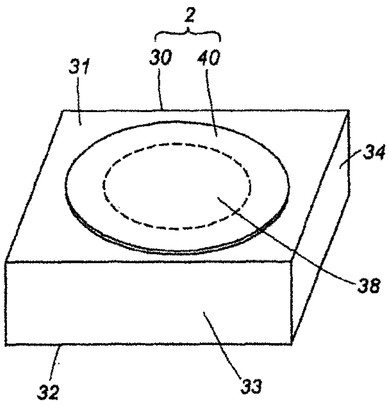

EMBODIMENTS OF THE INVENTION (1) Sealing Method Illustrated in FIGS. 1(*a*)-1(*c*) and FIGS. 2(*a*) and 2(*b*)

The sealing method of the present invention has a step of irradiating laser light onto a joining surface (sealing surface) of the metallic molded body with the resin molded body in an energy density of 1 MW/cm$^2$ or more and at an irradiation rate of 2000 mm/sec or more to roughen the joining surface (called a laser light irradiation step or a surface roughening step). In the surface roughening step, the roughened joining surface of the metallic molded body is adjusted so as to have a porous structure in which a hole (including a groove as well) is formed in a range of an average depth from 10 to 70 μm from a surface.

A metal of the metallic molded body to be used in the present invention is not particularly limited, but can be selected as needed from known metals depending upon an application thereof. The metal can be selected from, example, iron, various kinds of stainless steel, aluminum, zinc, titanium, copper, brass, chrome plating steel, magnesium and an alloy containing them, and cermet selected from tungsten carbide, chrome carbide and the like, and the present invention can be applied to the metals subjected to surface treatment such as alumite treatment and plate processing.

The metallic molded body to be used in the present invention is not particularly limited in the shape, thickness, structure and size as long as it has a cavity therein and an opening connected to the cavity, and the opening can be sealed by injection molding or compression molding.

For example, the metallic molded body may have a cavity therein and a plurality of openings connected to the cavity, or may have a cavity therein and one opening connected to the cavity.

FIG. 1(*a*) illustrates an embodiment of the metallic molded body to be used in the present invention. A tubular metallic molded body 10 has a first end surface 11, a second end surface 12 on the opposite side, a peripheral surface 13, and further, a through hole 14 as a cavity. The through hole 14 has a first opening **14*a* on the first end surface 11-side, and a second opening 14*b* on the second end surface 12**-side.

When sealing the first opening **14*a* by using the tubular metallic molded body 10 illustrated in FIG. 1**(*a*), an annular joining surface 15 surrounding the first opening **14*a* of the first end surface 11 is irradiated with laser light for surface roughening. It should be noted that when the entire first end surface 11 is the joining surface, the entirety of the first end surface 11** is irradiated with the laser light.

FIG. 2(*a*) illustrates a different embodiment of a metallic molded body to be used in the present invention. A metallic molded body 30 is formed in a box shape having a top surface 31, a bottom surface 32 at the opposite and four side surfaces 33 to 36, and has a hollow part 37 inside. The top surface 31 is provided with an opening 38 connected to the hollow part 37.

When sealing the opening 38 by using the box-shaped metallic molded body 30 illustrated in FIG. 2(*a*), an annular joining surface 39 surrounding the opening 38 of the top surface 31 is irradiated with laser light for surface roughening.

As a laser light irradiation method in the step of irradiating laser light to roughen the surface, any one or both of the following methods may be used:

(1) a method in which laser light is continuously irradiated to be in a straight line, a curved line or a combination of the straight line and the curved line on a joining surface of a metallic molded body to be roughened (first laser light irradiation method), and (2) a method in which laser light is irradiated to be in a straight line, a curved line, or a combination of a straight line and a curved line on the joining surface of the metallic molded body to be roughened and to generate laser light-irradiated portions and non-laser light-irradiated portions alternately in each of the straight lines and/or curved lines (second laser light irradiation method).

<First Laser Light Irradiation Method>

The first laser light irradiation method is known, and can be performed in the same way as the continuous irradiation method of laser light described in JP-B2 5774246, JP-B2 5701414, JP-B2 5860190, JP-B2 5890054, JP-B2 5959689, JP-A 2016-43413, JP-A 2016-36884 and JP-A 2016-44337.

However, the energy density of the laser light is required to be 1 MW/cm$^2$ or more. The energy density at the time of laser light irradiation is determined from output (W) of the laser light and a spot area (cm$^2$) ($\pi\cdot$[spot diameter/2]$^2$) of the laser light. The energy density at the time of laser light irradiation is preferably 2 to 1000 MW/cm$^2$, more preferably 10 to 800 MW/cm$^2$, and further preferably 10 to 700 MW/cm$^2$.

The irradiation rate of the laser light is 2000 mm/sec or more, preferably 2,000 to 20,000 mm/sec, more preferably 2000 to 18,000 mm/sec, and further preferably 3,000 to 15,000 mm/sec.

The output of the laser light is preferably 4 to 4000 W, more preferably 50 to 2500 W, and further preferably 150 to 2000 W. When other laser light irradiation conditions are the same, a depth of the hole (groove) is deeper as the output is larger, and the depth of the hole (groove) is shallower as the output is smaller.

A wavelength is preferably 500 to 11,000 nm. A beam diameter (spot diameter) is preferably 5 to 80 μm.

A defocusing distance is preferably −5 to +5 mm, more preferably −1 to +1 mm, and further preferably −0.5 to +0.1 mm. The defocusing distance may have a constant setting value to perform the laser irradiation, or the defocusing distance may be changed while performing the laser irradiation. For example, at the time of laser irradiation, the defocusing distance may be gradually made smaller, or may be periodically made larger and smaller. When the defocusing distance is adjusted to a minus (−), the depth of the hole becomes deeper.

By adjusting the repetition number at the time of laser light irradiation together with the irradiation of laser light by the above-mentioned laser light irradiation conditions, the roughened joining surface of the metallic molded body can be adjusted to have a porous structure in which a hole (groove) is formed in a range of the average depth of 10 to 70 μm from the surface. That is, in an embodiment of the present invention, one or more of the energy density of the laser light, the laser irradiation rate, the laser wavelength, the number of times of irradiation and the defocusing distance are adjusted such that the roughened joining surface of the metallic molded body has a porous structure in which the hole (groove) is formed in the range of the average depth of 10 to 70 μm from the surface.

The repetition number (a total number of irradiations of the laser light for forming one hole or groove) is preferably 1 to 9, more preferably 2 to 5. When the laser irradiation conditions are the same, the depth of the hole (groove) is deeper as the repetition number is larger, and the depth of the hole (groove) is shallower as the repetition number is smaller.

An average depth of the hole (groove) of the roughened joining surface in the metallic molded body is preferably in a range of an average depth 10 to 65 μm from the surface, and may be in a range of the average depth of 10 to less than 50 μm.

<Second Laser Light Irradiation Method>

Figure 3:
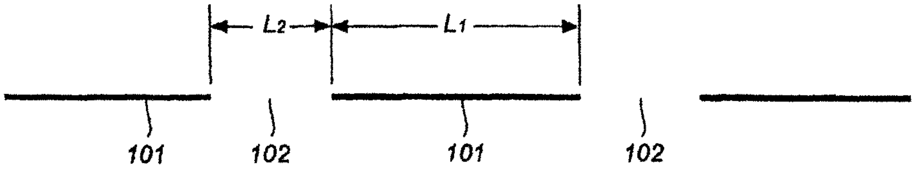
FIG. 3 is a diagram illustrating an irradiation state of laser light in one embodiment when performing a surface roughening method of the metallic molded body in the present invention.

In the second laser light irradiation method, performing irradiation so as to generate laser light-irradiated portions and non-laser light-irradiated portions alternately includes an embodiment in which the irradiation is performed as illustrated in FIG. 3.

FIG. 3 illustrates a state in which: a laser light-irradiated portion 101; and a non-laser light-irradiated portion 102 located between adjacent laser light-irradiated portions 101 are generated alternately so as to form dotted straight (or curved) lines as a whole. At this time, the laser light can be repeatedly irradiated in the same portion so as to make one dotted line in appearance as illustrated in FIG. 3. The number of times of repetition (the number of times of irradiation) may be 1 to 20 times, for example.

When the irradiation is performed by a plurality of times, the laser light-irradiated portions may be the same as above; or, by differentiating the laser light-irradiated portions (shifting the laser light-irradiated portions), the whole which is in a straight or curved pattern may be roughened.

When irradiation is performed a plurality of times with laser light-irradiated portions being the same, it is performed in a dotted line pattern. However, when laser light-irradiated portions are shifted, that is, irradiation is repeated by shifting such that the portions not irradiated with laser light at first are at least partially overlapped with laser light-irradiated portions, irradiation in a solid line is achieved in the end even when irradiation is made in a dotted line pattern each time.

When a metal molded body is irradiated with laser light continuously, the temperature of an irradiated surface increases, and thus a deformation such as warpage may occur in a molded body having a small thickness. Therefore, a countermeasure such as cooling may be required. However, as shown in FIG. 3, when laser irradiation is performed in a dotted line pattern, the laser light-irradiated portions 101 and the non-laser light-irradiated portions 102 are generated alternately, and the non-laser light-irradiated portions 102 are cooled. Thus, when the irradiation of laser light is continued, probability of occurrence of the deformation such as warpage is preferably reduced even when the thickness of a molded body is small. In this case, the same effect is achieved even when the laser light-irradiated portions are varied (laser light-irradiated portions are shifted) as described above since at each time of irradiation the laser light, the irradiation is performed in the dotted line pattern.

Figure 4:
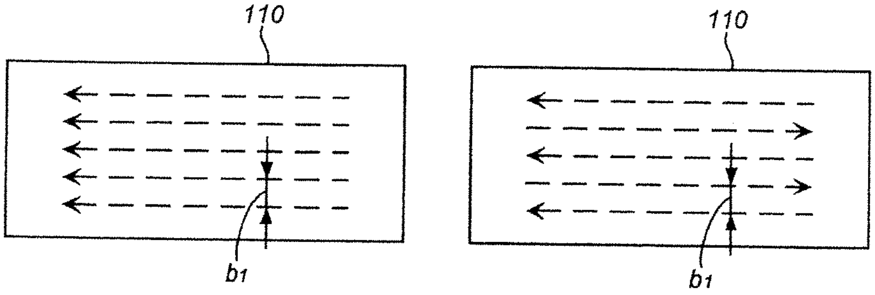
FIGS. 4(*a*) and 4(*b*) are diagrams illustrating an irradiation pattern of the laser light in the embodiment illustrated in FIG. 3 in which FIG. 4(*a*) illustrates the irradiation pattern in the same direction and FIG. 4(*b*) illustrates the bidirectional irradiation pattern.

The laser light irradiation method that may be used includes a method in which a plurality of irradiated portions in a dotted line pattern such as the above are irradiated parallel in one direction on the surface of the metal molded body 110 (joining surface) as illustrated in FIG. 4(*a*), or a method for irradiating bidirectionally as indicated by dotted lines illustrated in FIG. 4(*b*). Alternatively, a method for irradiating laser light so that the laser light-irradiated portions in a dotted line pattern intersect with one another may also be applicable. Such irradiation patterns may also be used for the first laser light irradiation method.

A distance b1 between each of the dotted lines after irradiation may be adjusted according to an area of the joining surface of the metal molded body, and for example, may be made in the range from 0.01 to 5 mm.

The ratio L1/L2 of the length (L1) of the laser light-irradiated portion 101 and the length (L2) of the non-laser light-irradiated portion 102 illustrated in FIG. 3 may be adjusted to range from 1/9 to 9/1. The length (L1) of the laser light-irradiated portion 101 is preferably 0.05 mm or more, more preferably 0.1 to 10 mm, and further preferably 0.3 to 7 mm to roughen into a complex porous structure.

In the second laser light irradiation method, laser may be irradiated by using a fiber laser apparatus in which a modulation device of a direct modulation system to directly convert a laser drive current is connected to a laser power source, and adjusting a duty ratio.

There are two types of laser excitation; pulsed excitation and continuous excitation, and a pulse wave laser generated by the pulsed excitation is typically referred to as a normal pulse. A pulse wave laser can be produced even by the continuous excitation. The pulse wave laser may be generated by a Q-switch pulse oscillation method, which is a method for making a pulse width (pulse-ON time) shorter than the normal pulse and oscillating laser with higher peak power correspondingly, an external modulation system which generates a pulsed wave laser by temporally cutting out light by an AOM or LN light intensity modulator, and a direct modulation system which generates a pulsed wave laser by directly modulating the laser drive current.

In the above preferred embodiment, a pulse wave laser is generated by continuously exciting laser by use of the fiber laser apparatus in which a modulation device of a direct modulation system to directly convert a laser drive current is connected to a laser power source, and the laser is different from the continuous wave laser used in the first laser irradiation method.

However, the energy density, the irradiation rate of the laser light, the output of the laser light, the wavelength, the beam diameter (spot diameter) and the defocusing distance of the laser light are implemented in the same way as the first laser irradiation method.

The duty ratio is a ratio determined by the following equation, $$\text{Duty ratio }(\%)=\text{ON time}/(\text{ON time}+\text{OFF time})\times 100$$

from the ON and OFF times of the output of the laser light.

The duty ratio, corresponding to L1/L2 illustrated in FIG. 3, may be selected from a range of 10 to 90%. By irradiating laser light with the duty ratio adjusted, irradiation in a dotted line pattern as illustrated in FIG. 3 is achieved. When the duty ratio is large, efficiency of the surface roughening step is improved, but cooling effect is lowered. In contrast, when the duty ratio is small, the cooling effect is improved, but the surface roughening efficiency is lowered. The duty ratio is preferably adjusted depending on the purpose.

In the second laser light irradiation method, a method of continuously irradiating laser in a state where masking members not allowing passage of laser light are disposed at intervals on the joining surface of a metal molded body to be roughened may be applied. The masking members may be or may not be in contact with the metal molded body. When irradiating laser light a plurality of times, the entire joining surface of the metal molded body can be roughened by changing the positions of the masking members.

Figure 5:
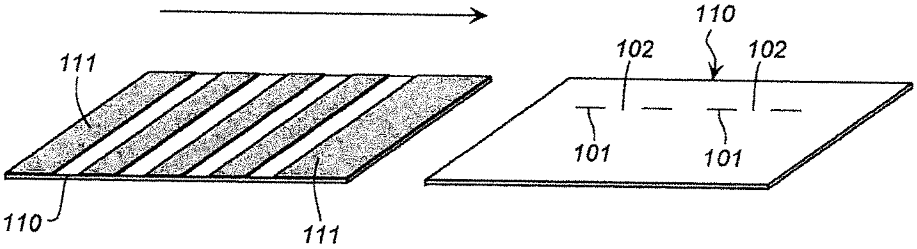
FIG. 5(*a*) and FIG. 5(*b*) are diagrams illustrating an irradiation step in an embodiment different from the embodiment illustrated in FIG. 3.

In one example of this embodiment, laser light is irradiated continuously in a state where a plurality of masking members 111 are disposed at intervals on the metal molded body 110 as illustrated in FIG. 5(*a*). As the masking members, a metal having a low thermal conductivity and the like may be used.

When the masking members 111 are removed after the irradiation of laser light, formed is a dotted line, as illustrated in FIG. 5(*b*), in which laser light-irradiated portions 101 and non-laser light-irradiated portions 102 are alternately generated in the same manner as in FIG. 3.

In the case of the embodiment illustrated in FIGS. 5(*a*) and 5(*b*), since the portions provided with the masking members 111 are cooled, probability of occurrence of the deformation such as warpage is preferably reduced even when the thickness of a molded body is small when irradiation of the laser light is continued.

The ratio L1/L2 of the length (L1) of the laser light-irradiated portion 101 and the length (L2) of the non-laser light-irradiated portion 102 may be adjusted to be ranged from 1/9 to 9/1 as in the case of FIG. 3. The length (L1) of the laser light-irradiated portion 101 is preferably 0.05 mm or more, preferably 0.1 to 10 mm, and more preferably 0.3 to 7 mm to roughen into a complex porous structure.

A known laser can be used as the laser to be used in the first laser light irradiation method and the second laser light irradiation method, and for example, a $YVO_4$ laser, a fiber laser (a single mode fiber laser, a multi-mode fiber laser), an excimer laser, a carbon dioxide laser, an ultraviolet laser, a YAG laser, a semiconductor laser, a glass laser, a ruby laser, a He—Ne laser, a nitrogen-laser, a chelate laser, or a dye laser may be used.

When performing the first laser light irradiation method or the second laser light irradiation method in the step of irradiating laser light onto a joining surface on a periphery of an opening of a metallic molded body to roughen the surface, irradiating the laser light so as to satisfy the energy density and the irradiation rate as described above causes the surface (joining surface) of the metal molded body to be partially evaporated while being melted, and consequently, holes having a complex structure are formed. The porous structure formed at this time is the same complicated structure as each of the structures illustrated in FIG. 7 and FIG. 8 of JP-B2 5774246 and FIG. 7 and FIG. 8 of JP-B2 5701414 or a porous structure similar thereto.

Meanwhile, if the energy density and the irradiation rate described above are not satisfied, holes (holes formed by ordinary pulse laser irradiation) are formed on the surface (joining surface) of the metal molded material due to sublimation of material, or the surface is melted (laser welded); thus, holes having a complex structure are not formed.

As described above, according to the embodiment of the present invention, the laser light irradiation step is a step of irradiating the laser light onto a peripheral part of the opening of the metallic molded body, such as a joining surface on a periphery of the opening, to roughen the surface thereof, and the opening may be a plurality of openings connected to the cavity in the metallic molded body or may be one opening connected to the cavity in the metallic molded body.

In the next step, a portion including the joining surface of the metallic molded body roughened in the preceding step is placed in a mold and a resin to be the resin molded body is injection-molded or compression-molded to seal the opening (sealing step).

The sealing step may be a step of placing a portion including the roughened peripheral part of the opening in the mold and sealing part of the plurality of openings in the metallic molded body or sealing one opening of the metallic molded body with the resin molded body formed by injection molding or compression molding of the resin.

In the preceding step, for example when irradiating the laser light onto an annular joining surface 15 surrounding the first opening 14*a* of the first end surface 11 of the metallic molded body 10 in FIG. 1(*a*) to roughen the surface, the first end surface 11-side of the metallic molded body 10 is placed in the mold to form a resin molded body 20 (see FIG. 1(*c*)) in a circle having the same shape and the same size as a circle including the annular joining surface 15 by injection molding or compression molding, which seals the first opening 14*a* to produce a composite molded body 1.

At the time of injection molding or compression molding, the resin in the melting state enters the inside of the porous structure of the roughened annular joining surface 15 and after that, is solidified, so that the annular joining surface 15 of the first end surface 11 of the metallic molded body 10 and the resin molded body 20 are integrated with a strong joining force in the composite molded body 1, and the joining portion has high sealability.

Therefore, the first opening 14*a* is sealed with the resin molded body 20, and even when air or water is made to flow in a state of being subjected to pressure from the second opening 14*b* of the composite molded body 1, air leakage or water leakage is not generated from the first opening 14*a*-side.

In the preceding step, for example, when irradiating the laser light onto the annular joining surface 39 surrounding the opening 38 of the top surface 31 of the metallic molded body 30 in FIG. 2(*a*) to roughen the surface, the top surface 31-side of the metallic molded body 30 is placed in the mold to form a resin molded body 40 in a circle having the same shape and the same size as a circle including the annular joining surface 39 by injection molding or compression molding, which seals the opening 38 to produce a composite molded body 2.

At the time of injection molding or compression molding, the resin in the melting state enters the inside of the porous structure of the roughened annular joining surface 39 and after that, is solidified, so that the annular joining surface 39 of the top surface 31 in the metallic molded body 30 and the resin molded body 40 are integrated with a strong joining force also in the composite molded body 2, and the joining portion has high sealability.

Therefore, the opening 38 is sealed with the resin molded body 40, and even when the composite molded body 2 is stored in a high temperature and high humidity atmosphere for a long period, the humidity does not enter from the opening 38.

Examples of a resin to be used in the resin molded body also include a thermoplastic elastomer in addition to a thermoplastic resin and a thermosetting resin.

The thermoplastic resin can be selected as needed from known thermoplastic resins depending upon an application thereof. An example thereof may include a polyamide resin (aliphatic polyamide, aromatic polyamide of PA6, PA66 and the like), a polystyrene, a copolymer including a styrene unit of an ABS resin, an AS resin or the like, a polyethylene, a copolymer including an ethylene unit, a polypropylene, a copolymer including a propylene, other polyolefins, a polyvinyl chloride, a polyvinylidene chloride, a polycarbonate resin, an acrylic resin, a methacrylic resin, a polyester resin, a polyacetal resin, and a polyphenylene sulfide resin.

The thermosetting resin can be selected as needed from known thermosetting resins depending upon an application thereof. An example thereof may include a urea resin, a melamine resin, a phenol resin, a resorcinol resin, an epoxy resin, a polyurethane, and a vinyl urethane.

The thermoplastic elastomer can be selected as needed from known thermoplastic elastomers depending upon an application thereof. An example thereof may include a styrene elastomer, a vinyl chloride elastomer, an olefin elastomer, an urethane elastomer, a polyester elastomer, a nitrile elastomer, and a polyamide elastomer.

A known fibrous filler can be blended in the thermoplastic resin, the thermosetting resin and the thermoplastic elastomer. Examples of the known fibrous filler may include a carbon fiber, an inorganic fiber, a metallic fiber, an organic fiber and the like.

The carbon fiber is a known fiber, and a PAN, pitch carbon, rayon or lignin carbon fiber or the like can be used.

Examples of the inorganic fiber may include a glass fiber, a basalt fiber, a silica fiber, a silica alumina fiber, a zirconia fiber, a boron nitride fiber, a silicon nitride fiber and the like.

Examples of the metallic fiber may include a fiber made of stainless steel, aluminum, copper or the like.

Examples of the organic fiber may include a polyamide fiber (a wholly aromatic polyamide fiber, a semi-aromatic polyamide fiber in which one of diamine and dicarboxylic acid is an aromatic compound, and an aliphatic polyamide fiber), a polyvinyl alcohol fiber, an acrylic fiber, a polyolefin fiber, a polyoxymethylene fiber, a polytetrafluoroethylene fiber, a polyester fiber (including a wholly aromatic polyester fiber), a polyphenylene sulfide fiber, a polyimide fiber, a synthetic fiber such as a liquid crystal polyester fiber, a natural fiber (a cellulose fiber or the like), a regenerated cellulose (rayon) fiber and the like.

The fiber fillers having a fiber diameter of a range of 3 to 60 μm may be used, but among them, it is preferable to use a fiber filler having a fiber diameter smaller than the diameter of an opening of a releasing hole or the like, which is for example formed by roughening the joining surface of the metal molded body. The fiber diameter is more preferably 5 to 30 μm, and further preferably 7 to 20 μm.

Figure 6:
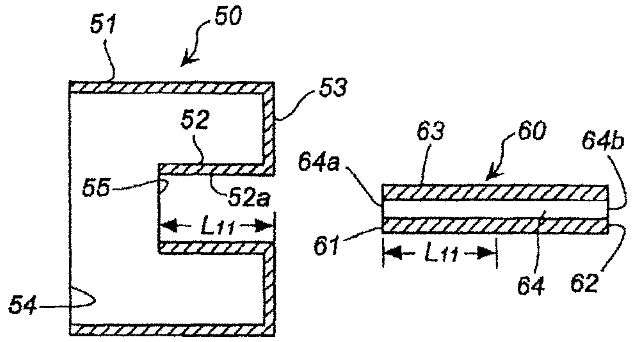
FIG. 6(*a*) to FIG. 6(*c*) are cross sectional views explaining a sealing method in an embodiment different from those in FIGS. 1(*a*)-1(*c*) and FIGS. 2(*a*) and 2(*b*), wherein FIG. 6(*c*) is a cross section of two metallic molded bodies (composite molded body) in which a gap is sealed with the resin molded body.
Figure 6:
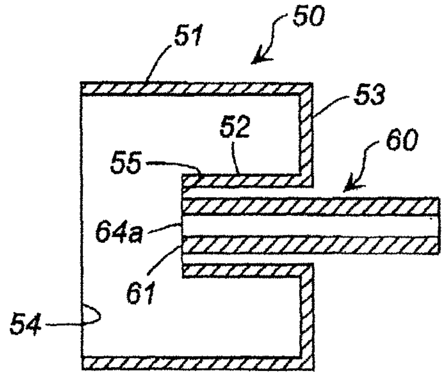
Figure 6:
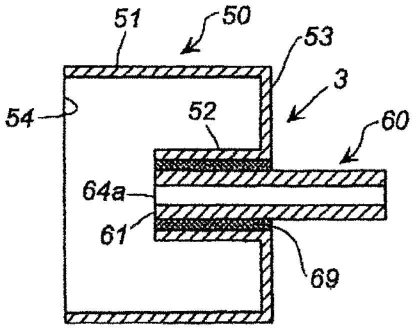
Figure 7:
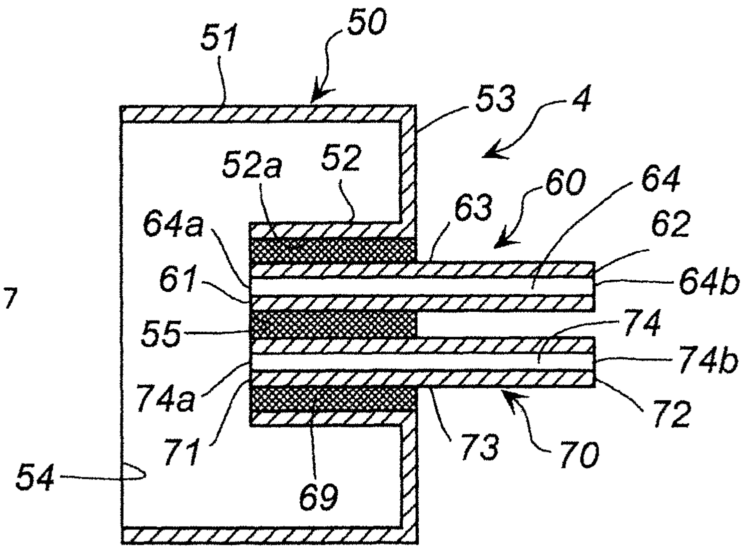
FIG. 7 is a cross section of metallic molded bodies (composite molded body) after being sealed with a resin molded body in an embodiment different from those in FIGS. 1(*a*)-1(*c*), FIGS. 2(*a*) and 2(*b*) and FIGS. 6(*a*)-6(*c*).

(2) Sealing Method Illustrated in FIGS. 6(*a*)-6(*c*) and FIG. 7

According to one embodiment of the present invention, the metallic molded body may be composed of a first metallic molded body and one or more other metallic molded bodies, and the first metallic molded body has a cavity therein and one or more openings connected to the cavity. In this case, the laser light irradiation step may be a step of irradiating the laser light onto a surface on a periphery of each opening to serve as a joining surface of the first metallic molded body and each portion to serve as a joining surface of the one or more other metallic molded bodies to roughen the surface, and the sealing step may be a step of placing each roughened portion of the one or more other metallic molded bodies in the opening of the first metallic molded body, and sealing the connecting portion with a resin molded body formed by injection molding or compression molding of a resin.

FIG. 6(*a*) illustrates a different embodiment of a metallic molded body to be used in the present invention, which uses two metallic molded bodies of a first metallic molded body 50 and a second metallic molded body 60.

The first metallic molded body 50 has an outer annular wall part 51, an inner annular wall part 52 extended in the same direction as the outer annular wall part 51 and an annular surface part 53 connecting one end of the outer annular wall part 51 and one end of the inner annular wall part 52. The outer annular wall part 51 and the inner annular wall part 52 have a relation of a length of the outer annular wall part 51>a length of the inner annular wall part 52.

A portion of the outer annular wall part 51 facing the annular surface part 53 has a large opening 54 defined by the other end of the outer annular wall part 51, and a portion of the inner annular wall part 52 facing the large opening 54 has a small opening 55 defined by the other end of the inner annular wall part 52.

The second metallic molded body 60 is formed in a tubular shape, and has a first end surface 61, a second end surface 62 on the opposite side, a peripheral surface 63, a through hole 64, a first opening 64*a* on the first end surface 61-side and a second opening 64*b* on the second end surface 62-side.

In the laser light irradiation step, an inner surface 52*a* (length L11) of the inner annular wall part 52 of the small opening 55 in the first metallic molded body 50 and the peripheral surface 63 of the tubular second metallic molded body 60 corresponding to a length L11 extending from the first end surface 61 toward the second end surface 62 are irradiated with the laser light for surface roughening.

The first laser light irradiation method and the second laser light irradiation method as described above can be applied as the irradiation method of the laser light. The surface roughening step forms a complicated porous structure in a range of an average depth of 10 to 70 μm from a surface on the periphery or the peripheral portion of the opening, as the joining surface of the metallic molded body.

Next, as illustrated in FIG. 6(*b*), the first metallic molded body 50 and the second metallic molded body 60 are placed in the mold such that a central axis of the inner annular wall part 52 of the first metallic molded body 50 corresponds to a central axis of the second metallic molded body 60, and a surface defined by the small opening 55 of the first metallic molded body 52 corresponds to the first end surface 61 of the second metallic molded body 60.

Thereafter, a resin is injection-molded or compression-molded to form a resin molded body 69, which seals a gap between the inner surface 52*a* and the second metallic molded body 60 to produce a composite molded body 3 illustrated in FIG. 6(*c*).

At the time of injection molding or compression molding, the resin in the melting state enters the inside of the porous structure formed in each of the roughened inner surface 52*a* (length L11) of the inner annular wall part 52 in the first metallic molded body 50 and a portion of the peripheral surface 63 of the tubular second metallic molded body 60 corresponding to a length L11 extending from the first end surface 61 to the second end surface 62 and after that, is solidified, so that the first metallic molded body 50 and the second metallic molded body 60 are integrated with a strong joining force through the resin molded body 69, and the joining portion has high sealability.

That is, by performing the sealing method of the present invention, the first metallic molded body 50 and the second metallic molded body 60 can be connected via the resin molded body 69, and each of the joining surface of the first metallic molded body 50 with the resin molded body 69 and the joining surface of the second metallic molded body 60 with the resin molded body 69, as well as the portion between both of the joining surfaces can be completely sealed. Therefore, no gas or liquid enters from the connecting portion of the first metallic molded body 50 or the second metallic molded body 60 with the resin molded body 69.

It is possible to manufacture a composite molded body as similar in appearance to the composite molded body 3 illustrated in FIG. 6(*c*) even if only the sealing step is performed without performing the laser light irradiation step. However, when the composite molded body continues to be used while being subjected to pressure from the inside and/or the outside, a gap may be generated between the joining surface of the first metallic molded body 50 with the resin molded body 69 and/or the joining surface of the second metallic molded body 60 with the resin molded body 69, which may result in a risk of not being able to perform sealing.

FIG. 7 illustrates a different embodiment of a metallic molded body to be used in the present invention, in which a third metallic molded body 70 identical in shape to the second metallic molded body 60 is used in addition to the first metallic molded body 50 and the second metallic molded body 60 having a structure as similar to that in FIGS. 6(*a*)-6(*c*). The third metallic molded body 70 is formed in a tubular shape similar to that of the second metallic molded body 60, and has a first end surface 71, a second end surface 72 on the opposite side, a peripheral surface 73, a through hole 74, a first opening 74*a* on the first end surface 71-side and a second opening 74*b* on the second end surface 72-side.

In the laser light irradiation step, the inner surface 52*a* (length L11, refer to FIG. 6(*a*)) of the inner annular wall part 52 of the small opening 55 in the first metallic molded body 50, the portion (refer to FIG. 6(*a*)) of the peripheral surface 63 of the tubular second metallic molded body 60 corresponding to the length L11 from the first end surface 61 to the second end surface 62, and a portion of the peripheral surface 73 of the third metallic molded body 70 corresponding to the length L11 (not illustrated) extending from the first end surface 71 to the second end surface 72 are irradiated with the laser light for surface roughening.

The first laser light irradiation method and the second laser light irradiation method as described above can be applied as the irradiation method of the laser light. The surface roughening step forms a complicated porous structure in a range of an average depth of 10 to 70 μm from the roughened surface.

Next, as similar to FIG. 6(*b*), the second metallic molded body 60 and the third metallic molded body 70 are placed in the mold to be equally spaced in the inside of a space defined by the inner annular wall part 52 of the first metallic molded body 50 such that a surface defined by the small opening 55 of the first metallic molded body 52 corresponds to the first end surface 61 of the second metallic molded body 60 and the first end surface 71 of the third metallic molded body 70.

Thereafter, a resin is injection-molded or compression-molded to form the resin molded body 69, which seals a gap between the small opening 55 and the second and third metallic molded bodies 60 and 70 to produce a composite molded body 4 illustrated in FIG. 7.

At the time of injection molding or compression molding, the resin in the melting state enters the inside of the porous structure formed in each of the roughened inner surface 52*a* (length L11) of the inner annular wall part 52 in the first metallic molded body 50, the portion of the peripheral surface 63 of the tubular second metallic molded body 60 corresponding to the length L11 extending from the first end surface 61 to the second end surface 62 and the portion of the peripheral surface 73 of the tubular third metallic molded body 70 corresponding to the length L11 extending from the first end surface 71 to the second end surface 72, and after that, is solidified. Therefore, the first metallic molded body 50, the second metallic molded body 60 and the third metallic molded body 70 are integrated with a strong joining force through the resin molded body 69, and the joining portion has high sealability.

That is, by performing the sealing method of the present invention, the first metallic molded body 50, the second metallic molded body 60 and the third metallic molded body 70 can be connected via the resin molded body 69, and each of the joining surface of the first metallic molded body 50 with the resin molded body 69, the joining surface of the second metallic molded body 60 with the resin molded body 69 and the joining surface of the third metallic molded body 70 with the resin molded body 69, as well as portions among these joining surfaces can be completely sealed. Therefore, no gas or liquid enters from the connecting portion of the first metallic molded body 50, the second metallic molded body 60 or the third metallic molded body 70 with the resin molded body 69.

It is possible to manufacture a composite molded body as similar in appearance to the composite molded body 4 illustrated in FIG. 7 even if only the sealing step is performed without performing the laser light irradiation step. However, when the composite molded body continues to be used while being subjected to pressure from the inside and/or the outside, a gap may be generated among the joining surface of the first metallic molded body 50 with the resin molded body 69, the joining surface of the second metallic molded body 60 with the resin molded body 69 and/or the joining surface of the second metallic molded body 70 with the resin molded body 69, which may result in a risk of not being able to perform sealing.

(3) Sealing Method Illustrated in FIGS. 8(*a*)-8(*c*)

According to one embodiment of the present invention, the metallic molded body may be composed of a plurality of metallic pipes, and the laser light irradiation step may be a step of irradiating laser light onto outer surfaces of connecting portions of the openings of the plurality of metallic pipes to roughen the surfaces, and the sealing step may be a step of placing the roughened connecting portions of the metallic pipes in the mold and sealing the connecting portions with a resin molded body formed by injection molding or compression molding of a resin from outside.

FIG. 8(*a*) illustrates a different embodiment of a metallic molded body to be used in the present invention, and two metallic pipes including a first metallic pipe 120 and a second metallic pipe 130 are used. The first metallic pipe 120 has a first flange part 121 on a one-end opening side, and the second metallic pipe 130 has a second flange part 131 on a one-end opening side.

The first metallic pipe 120 and the second metallic pipe 130 are connected by a fastening means such as a combination of a bolt and a nut not illustrated in a state where the first flange part 121 abuts on the second flange part 131.

In the laser light irradiation step, the outer surface of the connecting portion in the opening of the first metallic pipe 120 including the first flange part 121 and the outer surface of the connecting portion in the opening of the second metallic pipe 130 including the second flange part 131 are irradiated with the laser light for surface roughening.

The first laser light irradiation method and the second laser light irradiation method as described above can be applied as the irradiation method of the laser light. The surface roughening step forms a complicated porous structure in a range of an average depth of 10 to 70 μm from the roughened surface.

In the sealing step, in a state where the roughened portion including the connecting portion between the first flange part 121 of the first metallic pipe 120 and the second flange part 131 of the second metallic pipe 130 is placed in the mold, a resin is injection-molded or compression-molded to form a resin molded body 135, which seals the connecting portion between the first metallic pipe 120 and the second metallic pipe 130 from outside.

In the conventional connecting state using flanges as illustrated in FIG. 8(*a*), the first flange part 121 and the second flange part 131 are connected in a state where a sealing tape is disposed in an abutting portion therebetween. However, due to deterioration of the sealing tape caused by a liquid pressure or a gas pressure continuously added from inside, a liquid leakage or a gas leakage is possibly generated after an elapse of several months, for example.

When the connecting portion between the first metallic pipe 120 and the second metallic pipe 130 is covered with the resin molded body 135 from outside to be sealed as illustrated in FIG. 8(*a*), the resin in the melting state enters the inside of the roughened porous structure including the connecting portion between the first metallic pipe 120 and the second metallic pipe 130, and after that, is solidified. Therefore, the first metallic pipe 120, the second metallic pipe 130 and the resin molded body 135 can be integrated with a strong joining force, and high sealability can be imparted to the joining portion.

Therefore, as compared to the conventional method of using the sealing tape, the liquid leakage or the gas leakage is prevented from being generated from the connecting portion for a much longer period. It should be noted that in the embodiment illustrated in FIG. 8(*a*), the first metallic pipe 120 and the second metallic pipe 130 can be separated by destroying the resin molded body 135.

FIG. 8(*b*) illustrates a different embodiment of a metallic molded body to be used in the present invention, and two metallic pipes including a first metallic pipe 140 and a second metallic pipe 150 are used. The first metallic pipe 140 has a screw part on an outer surface on the side of a connecting end to the second metallic pipe 150. The second metallic pipe 150 has an enlarged diameter part 151 on the side of a connecting end to the first metallic pipe 140, and has a screw part on an inner surface of the enlarged diameter part 151. The first metallic pipe 140 and the second metallic pipe 150 are connected by screwing an end of the first metallic pipe 140 into the inside of the enlarged diameter part 151 of the second metallic pipe 150.

In the laser light irradiation step, the outer surface on a periphery of the connecting end excluding the screw part of the end of the first metallic pipe 140 and the outer surface including the enlarged diameter part 151 of the end of the second metallic pipe 130 are irradiated with the laser light for surface roughening.

The first laser light irradiation method and the second laser light irradiation method as described above can be applied as the irradiation method of the laser light. The surface roughening step forms a complicated porous structure in a range of an average depth of 10 to 70 μm from the roughened surface.

In the sealing step, in a state where the roughened portion including the connecting portion between the first metallic pipe 140 and the second metallic pipe 150 is placed in the mold, a resin is injection-molded or compression-molded to form a resin molded body 155, which seals the connecting portion between the first metallic pipe 140 and the second metallic pipe 150 from outside.

In the conventional connecting state using the structure as illustrated in FIG. 8(*b*), connection is made in a state where a sealing tape is disposed between the screw part of the first flange part 140 and the screw part of the second flange part 150. However, due to deterioration of the sealing tape caused by a liquid pressure or a gas pressure continuously added from inside, a liquid leakage or a gas leakage is possibly generated after an elapse of several months, for example.

As illustrated in FIG. 8(*b*), when sealing is performed by covering with the resin molded body 155 from outside, the resin in the melting state enters the inside of the roughened porous structure of the first metallic pipe 140 and the second metallic pipe 150, and after that, is solidified. Therefore, the first metallic pipe 140, the second metallic pipe 150 and the resin molded body 155 can be integrated with a strong joining force, and high sealability can be imparted to the joining portion.

Therefore, as compared to the conventional method of using the sealing tape, the liquid leakage or the gas leakage is prevented from being generated from the connecting portion for a much longer period. It should be noted that in the embodiment illustrated in FIG. 8(*b*), the first metallic pipe 140 and the second metallic pipe 150 can be separated by destroying the resin molded body 155.

FIG. 8(*c*) illustrates a different embodiment of a metallic molded body to be used in the present invention, in which two metallic pipes including a first metallic pipe 160 and a second metallic pipe 170 are used. Each of the first metallic pipe 160 and the second metallic pipe 170 is one pipe and does not have a connecting means such as the flange part or the screw part as illustrated in FIGS. 8(*a*), 8(*b*).

In the laser light irradiation step, the outer surface of the connecting portion of the periphery of the opening at the end of the first metallic pipe 160 and the outer surface of the connecting portion of the periphery of the opening at the end of the second metallic pipe 170 are irradiated with the laser light for surface roughening.

The first laser light irradiation method and the second laser light irradiation method as described above can be applied as the irradiation method of the laser light. The surface roughening step forms a complicated porous structure in a range of an average depth of 10 to 70 μm from the roughened surface.

In the sealing step, the first end surface 161 of the first metallic pipe 160 and the first end surface 171 of the second metallic pipe 170 are placed in the mold in a state where they are abutted with each other, and a resin is injection-molded or compression-molded to form a resin molded body 175, which connects the first metallic pipe 160 and the second metallic pipe 170 and seals the connecting portion from outside.

Conventionally, for connecting two metallic pipes, it was required to use a combination of the first metallic pipe 120 having the first flange part 121 and the second metallic pipe 130 having the second flange part 131 as illustrated in FIG. 8(*a*) or a combination of the first metallic pipe 140 and the second metallic pipe 150 each having the screw part as illustrated in FIG. 8(*b*).

However, when sealing is performed by using the sealing method of the present invention to cover the metallic pipes with the resin molded body 175 from outside and connect them as illustrated in FIG. 8(*c*), the resin in the melting state enters the inside of the roughened porous structure of the first metallic pipe 160 and the second metallic pipe 170, and after that, is solidified. Therefore, the first metallic pipe 160 and the second metallic pipe 170 can be connected through the resin molded body 175 without using the connecting means such as the flange part (including a bolt and a nut) or the screw part illustrated in FIGS. 8(*a*), 8(*b*), and high sealability can be imparted to the joining parts. Therefore, the liquid leakage or the gas leakage is prevented from being generated from the connecting portion for a very long period. It should be noted that in the embodiment illustrated in FIG. 8(*c*), the first metallic pipe 160 and the second metallic pipe 170 can be separated by destroying the resin molded body 175.

EXAMPLES

Examples 1 to 6 and Comparative Examples 1 to 4

An annular joining surface 201 (broadness range of 392.5 $mm^2$) of the metallic molded body (aluminum: A5052 or stainless SUS304) 200 having a shape and a dimension illustrated in FIG. 9(*a*) was irradiated with laser light on a condition illustrated in Table 1 (the first laser light irradiation method) to roughen the laser light irradiation surface, that is, the annular joining surface.

While the irradiation pattern is bidirectional as in FIG. 4(*b*), it is the same irradiation pattern as FIG. 4(*b*) and is an irradiation pattern illustrated by a solid line, as the first laser light irradiation method (continuous irradiation of the laser light) is used.

The laser apparatus used includes the following:

Oscillator: IPG-Yb fiber; YLR-300-SM

Collector optics: fc=80 mm/fθ=100 mm

Defocusing distance: ±0 mm (constant)

Next, the injection molding was performed by the following method using the roughened metallic molded body 200 to seal an opening 202 of the metallic molded body 200 with a resin molded body 210 (FIG. 9(*b*)).

<Injection Molding>

GF35% reinforcement PPS resin (DURAFIDE 1135MFI: made by Polyplastics, Ltd), GF (Glass Fiber)

Resin temperature: 320° C.

Mold temperature: 150° C.

Injection molding machine: ROBOSHOT S2000i100B made by Fanuc (Groove Depth)

The depth of the groove (hole) was found by measuring the surface (broadness range of 392.5 $mm^2$) subjected to the laser light irradiation by a digital microscope VHX-900 (made by Keyence Corporation, Ltd). The average groove (hole) was obtained by measuring depths at ten locations dispersed at equal intervals on the entire laser irradiation surface, and determining an average value therefrom.

(Sealability)

The sealability was tested as follows. A composite molded body composed of the metallic molded body 200 and the resin molded body 210 illustrated in FIG. 9(*b*) was fixed to an opening of a metallic testing container 220 illustrated in FIG. 9(*c*). The metallic testing container 220 and the metallic molded body 200 were fixed by welding. After that, water 230 was put in the metallic testing container 220 until the composite molded body was completely immersed. In this state, the sealability was evaluated based upon whether or not the air leakage was generated (whether or not bubbles were generated in water 230) at the time of feeding air in an inside space 221 at 0.5 MPa from a lateral side of the testing container 220 for three minutes under a room temperature environment. A case where bubbles did not generate was evaluated as good, and a case where bubbles generated was evaluated as poor.

As is apparent from comparison of sealability between Examples 1 to 3 and Comparative Examples 1, 2, and between Examples 4 to 6 and Comparative Examples 3, 4, high sealability was acquired by applying the sealing method of the present invention.

The sealing method in the present invention is excellent in sealability of the connecting portion between a metallic molded body and a resin molded body, and therefore, can be used for seal of an partial opening of a regular pipe, a trident pipe and the like, seal of a container (a housing where a plurality of components are accommodated, or the like) opening for moisture absorption prevention, connection and seal of metallic pipes, and the like.

The invention claimed is:

1. A composite molded body comprising:

a metallic molded body and a resin molded body sealing the metallic molded body;

the metallic molded body having a cavity therein;

the metallic molded body having at least one opening through a joining surface with the resin molded body, the at least one opening through the joining surface is directly connected to the cavity;

the joining surface of the metallic molded body with the resin molded body is roughened at a periphery of the at least one opening, the roughened joining surface at the periphery of the at least one opening of the metallic molded body having a porous structure in which holes are formed in a range of an average depth from 10 to 70 μm; and with the resin having been solidified in a state of entering into an interior of the porous structure formed in the joining surface at the periphery of the at least one opening of the metallic molded body, the at least one opening of the metallic molded body is sealed with the resin molded body in the composite molded body.

2. The composite molded body according to claim 1, wherein the metallic molded body is a tubular metallic molded body having a first end surface and a second end surface opposite the first end surface, the cavity is a through hole having a first opening on a side of the first end surface and a second opening on a side of the second end surface, the joining surface is an annular joining surface surrounding

TABLE 1

| | Example 1 | Example 2 | Example 3 | Comparative Example 1 | Comparative Example 2 | Example 4 | Example 5 | Example 6 | Comparative Example 3 | Comparative Example 4 |
|---|---|---|---|---|---|---|---|---|---|---|
| Kind of Metallic Plate | | | A5052 | | | | | SUS304 | | |
| Laser Oscillator | | | Single Mode Fiber Laser | | | | | Single Mode Fiber Laser | | |
| Output (V) | 7.5 | 7.5 | 10 | 10 | 10 | 7.5 | 10 | 10 | 10 | 10 |
| Wavelength (nm) | | | 1070 | | | | | 1070 | | |
| Spot Diameter (μm) | | | 11 | | | | | 11 | | |
| Energy Density ($MW/cm^2$) | 207 | 207 | 276 | 276 | 276 | 207 | 276 | 207 | 276 | 276 |
| Laser Irradiation Rate (mm/sec) | | | 10000 | | | | | 7500 | | |
| Irradiation Pattern | | | Bidirectional | | | | | Bidirectional | | |
| Number of Lines | | | 600 | | | | | 600 | | |
| Distance between Lines (b1) (mm) | | | 0.05 | | | | | 0.05 | | |
| Repetition Number | 3 | 5 | 3 | 5 | 10 | 5 | 3 | 5 | 5 | 10 |
| Treatment Area ($mm^2$) | | | 392.5 | | | | | 392.5 | | |
| Working Time (s) | 9.9 | 16.3 | 9.9 | 16.3 | 32.6 | 17.6 | 10.6 | 17.6 | 17.6 | 35.3 |
| Average Groove Depth (μm) | 28 | 46 | 62 | 90 | 133 | 35 | 40 | 64 | 107 | 168 |
| Sealability | Good | Good | Good | Poor | Poor | Good | Good | Good | Poor | Poor |

the first opening on the first end surface, and the first opening is sealed with the resin molded body.

3. The composite molded body according to claim 1, wherein the metallic molded body has a top surface, a bottom surface opposite the top surface, and side surfaces, the cavity is an internal hollow part, the opening is formed in the top surface and connected to the internal hollow part, the joining surface is an annular joining surface surrounding the opening, and the opening is sealed with the resin molded body.

* * * * *